United States Patent [19]

Khoshnevis

[11] Patent Number: 4,500,749
[45] Date of Patent: Feb. 19, 1985

[54] INCREMENTAL DIGITIZER FOR ENCODING GEOMETRICAL FORMS

[76] Inventor: Behrokh Khoshnevis, 2-102G Montasello Village, Athens, Ohio 45701

[21] Appl. No.: 449,589

[22] Filed: Dec. 14, 1982

[51] Int. Cl.³ .................... G01B 7/28; G08C 21/00
[52] U.S. Cl. ............................. 178/18; 33/1 M
[58] Field of Search .................. 178/18, 19, 20; 346/139 C; 340/709; 33/1 M, 1 N, 1 PT

[56] References Cited

U.S. PATENT DOCUMENTS

| 3,516,067 | 6/1970 | Cameron | 178/18 X |
| 3,665,608 | 5/1972 | Stockebrand | 33/1 M |
| 3,832,781 | 9/1974 | Flagge | 33/1 M X |

Primary Examiner—Stafford D. Schreyer
Attorney, Agent, or Firm—Frank H. Foster

[57] ABSTRACT

A digitizer for digitizing two and three dimensional geometrical forms. The digitizer uses extensible cords on pivotal reels. Information on cord extension and pivot angle is utilized to calculate stylus position in a desired coordinate system. Three dimensional objects rest upon a pivotal table which also provides digitizing information.

13 Claims, 9 Drawing Figures

INCREMENTAL DIGITIZER FOR ENCODING GEOMETRICAL FORMS

TECHNICAL FIELD

This invention relates generally to peripheral input equipment for computers and more particularly relates to a digitizer for encoding geometrical forms such as maps, graphs and physical models or ports into digital code representing the geometrical form.

BACKGROUND ART

The development of digital computers has created a need for devices which can convert information found in analog form such as maps, graphs and models to digital data so that the information can be processed by the computer.

Several devices are currently used to digitize two dimensional forms. Typically these devices has a stylus, cursor, index or other structure for defining data points. Such a structure is collectively referred to herein as a stylus and is moved to spaced points on the form. The computer senses the position of this stylus and converts digital data representing the sensed position to appropriate Cartesian, polar or other coordinate system data. A plurality of such data points then define the form in digital format.

One conventional type of digitizer uses a specially constructed table or tablet upon which the form to be digitized is mounted. For example, the device of U.S. Pat. No. 3,732,557 utilizes a conductor array in the tablet. U.S. Pat. No. 3,792,243 discloses a capacitance tablet. The principal difficulty with such tablet dependent digitizers is that the tablets are expensive to construct and the size of the form to be digitized is limited to the size of the tablet. Additionally, such tablets are not very portable and therefore can be used only in limited places.

A difficulty with tablet dependent digitizers using a matrix is that the computer must continuously scan the matrix looking for input position signals. This scanning operation takes considerable computer time and therefore requires that the stylus be moved more slowly between data points thus lengthening the time required to complete the entire job.

Still other digitizing devices use orthogonally related bars, carriages and tapes such as those shown in U.S. Pat. Nos. 3,271,562 and 2,413,300. Such devices, however, not only are similarly constrained to limited physical sizes but are complicated and bulky mechanical structures which are inconvenient and clumsy to use. The long bars on mechanical structures used in some digitizer equipment are not only difficult to use because they tend to be in the way but they have a tendency to bend and therefore cause inaccuracy.

Still other devices utilize radiant energy such as sound, light or electromagnetic energy to detect the position of the stylus. Such devices are shown in U.S. Pat. Nos. 4,138,592, 3,515,888 and 4,124,838.

There is therefore a need for a structurally simpler digitizer which is easy to use and can be fabricated at a considerably lower cost. The present invention offers these advantages and is also portable and can digitize at a faster speed. The present invention is not tablet dependent because no special tablet and in fact no tablet is necessary.

Digitizers constructed in accordance with the present invention may be mounted upon a wall, for example, to digitize a large wall mounted map. They may be transported out into the field to digitize objects or forms which can not be brought to the computer. The digitizer of the present invention has no bulky carriages or tracks which must extend over the form to be digitized.

Another feature of the present invention is that as a result of its simplicity, fewer computer operations are needed to convert input position data from the digitizer to coordinate system data.

Digitizers constructed in accordance with the present invention may be used to digitize both two-dimensional and three-dimensional forms. Two-dimensional forms, such as contour maps or transit routes may be digitized. Also, graphically presented data may be digitized. The digitizer of the present invention may be used for computer generation of graphics.

Digitizers constructed in accordance with the present invention may also be utilized to digitize three-dimensional objects. This is useful, for example, for preparation of graphics from a solid model, the plotting of graphs or the preparation of technical drawings. Further, the present invention may be used to generate data from a model or pattern for controlling a numerically controlled machine tool.

BRIEF DISCLOSURE OF THE INVENTION

The present invention is a digitizer having one or more retractable, flexible cords which extend into attachment with a stylus and are biased in tension toward retraction. The cord or cords are not confined to orthogonal relationships.

Different embodiments of the invention utilize means for encoding changes in the linear extension or retraction of the cord or encoding means for encoding angular displacement of the angular orientation of the cord or combinations of both.

In describing the preferred embodiment of the invention illustrated in the drawings, specific terminology will be resorted to for the sake of clarity. However, it is not itnended to be limited to the specific terms so selected and it is to be understood that each specific term includes all technical equivalents which operate in a similar manner to accomplish a similar purpose.

DETAILED DESCRIPTION

Figure 1:
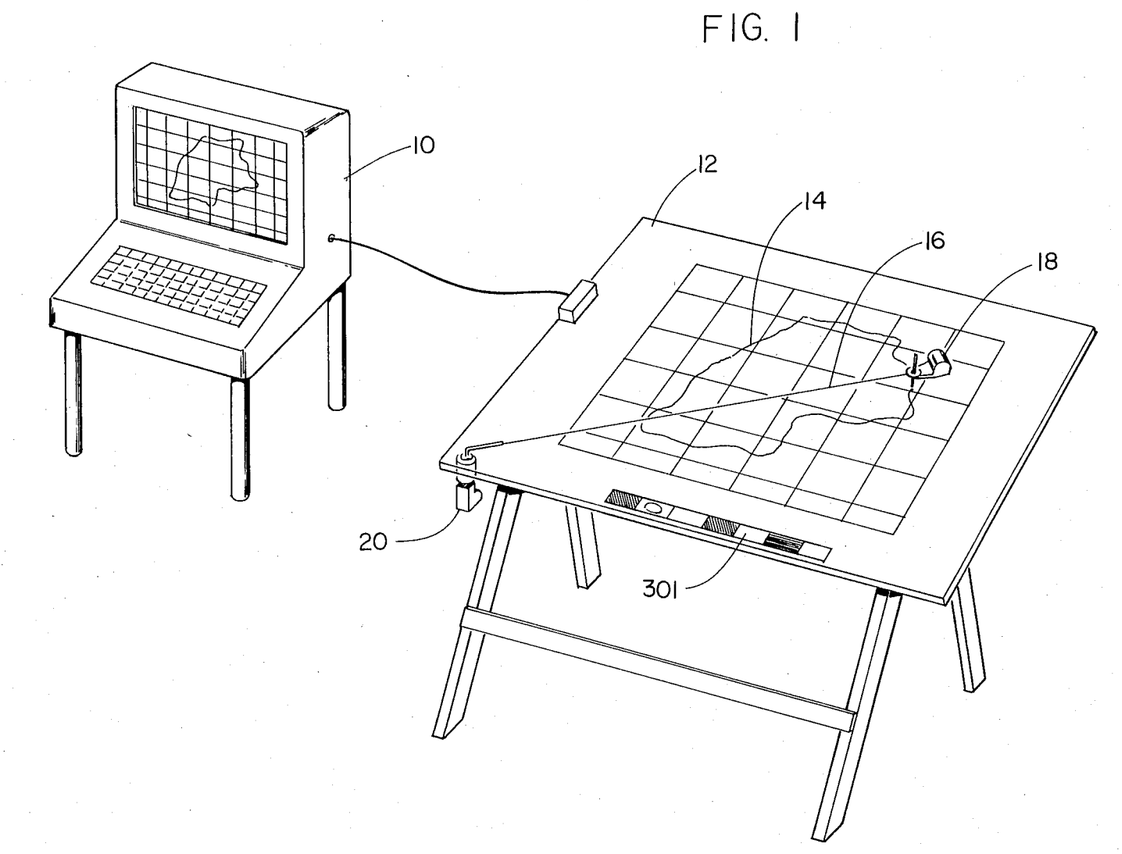
FIG. 1 is a view in perspective of a single cord embodiment of the invention for digitizing two-dimensional forms and connected to a computer console.

FIG. 1 illustrates a single cord embodiment of the present invention. The principle advantages of the single cord embodiment are its simplicity of construction, consequent low price and ease of use.

FIG. 1 illustrates a digital computer console 10 connected to a drawing table 12 which supports a geometrical form 14 drawn on a sheet of material such as a map. A cord 16 extends in one direction into connection with a stylus 18 and in the opposite direction into a retraction and encoding mechanism 20.

Figure 8:
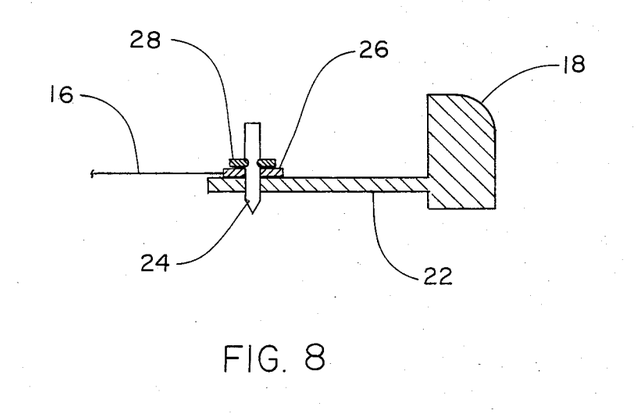
FIG. 8 is a view in vertical section illustrating an alternative stylus for use in the present invention.
Figure 9:
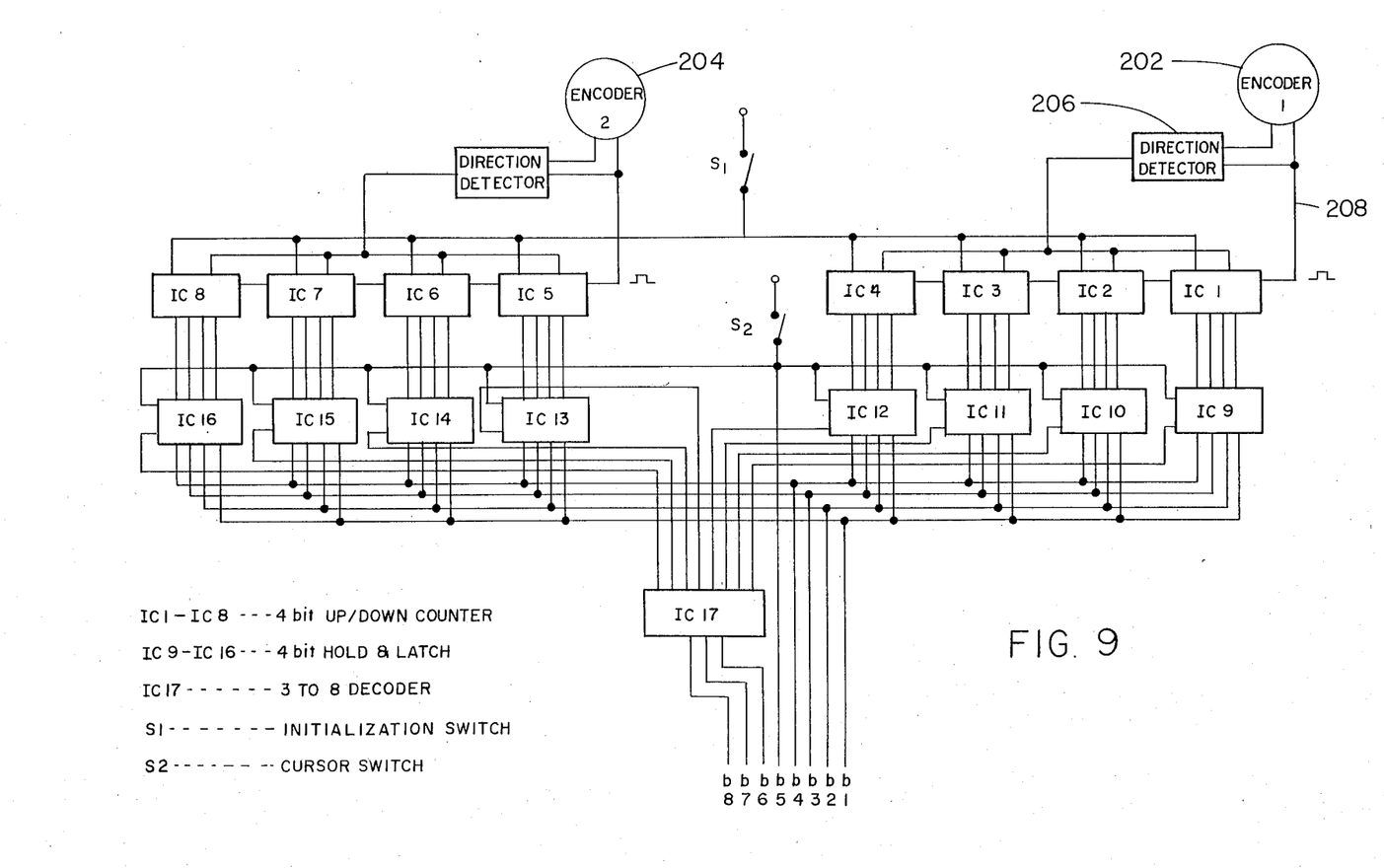
FIG. 9 is a schematic diagram of the encoder counter and data bus interface circuitry.

The stylus 18 is illustrated in more detail in FIG. 8. It has a handle grip portion 22 fixed to a pointed data tip 24 which is positioned by the user during operation at each data point being digitized. Rotatably mounted to the data tip 24 is a ring 26 which is fixed to the cord 16. A snap ring 28 is secured in a groove on the data tip 24 to prevent axial movement of the ring 26. In this manner the data tip 24 can be accurately positioned at a variety of data points on the two-dimensional geometrical form 14 and the axis of the cord 16 will always pass over the data point being digitized.

Figure 2:
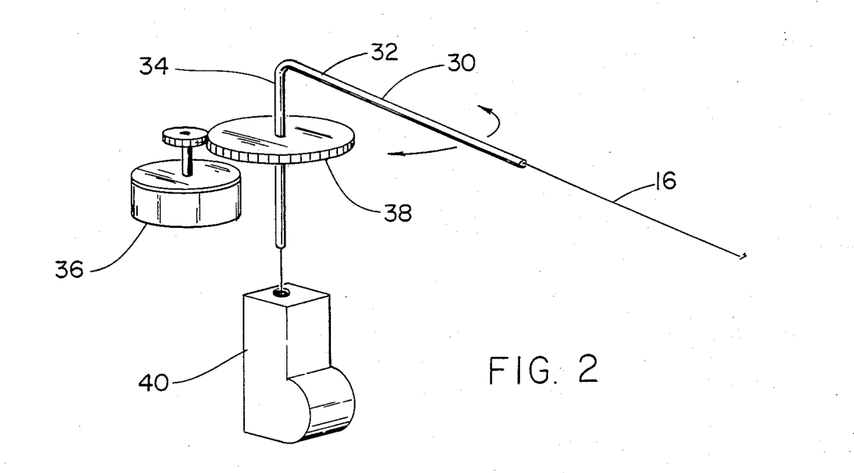
FIG. 2 is a view in perspective of the angle encoder utilized in the preferred embodiments of the invention.
Figure 3:
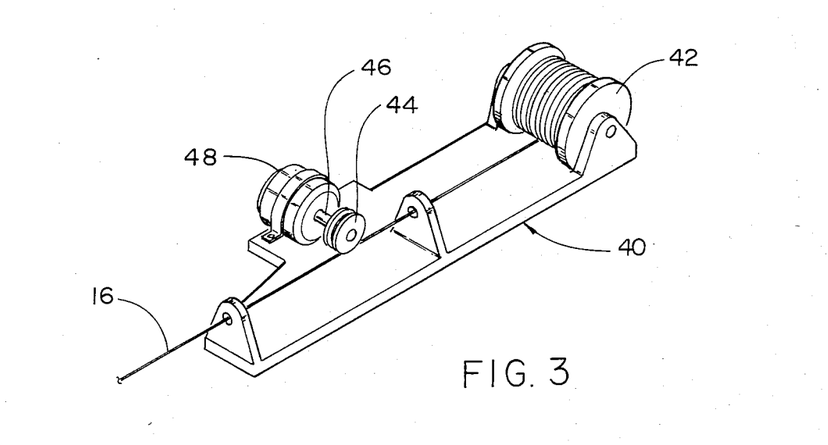
FIG. 3 is a view in perspective of a linear encoder preferred for use in the embodiments of the invention.

The retraction and encoding structure 20 illustrated in FIG. 1 is illustrated in more detail in FIGS. 2 and 3. Referring to FIG. 2, the cord 16 extends through a cord guide 30. The preferred cord guide is a tube bent at a right angle and having one end 32 extending toward the stylus 18 and the other end 34 drivingly linked to an angular shaft encoder 36. The angular encoder 36 is a conventional shaft encoder which is well known to those in the art. A typical one is, for example, described in Hewlett Packard application note 1011. Such shaft encoders provide digital data representing the incremental angular displacement of a rotatable shaft. The shaft encoder 36 is linked to the cord guide 30 through a suitable drive train 38. In this manner the angular encoder 36 is responsive to pivotal movement of the guide cord 30 about the axis of its end 34.

The cord 16 extends through the cord guide 30 and into a linear encoder 40 which generates digital data signals representing the linear displacement of the cord, that is movement of the cord retracting into and extending out of the cord guide 30.

The linear encoder 40 includes a biased reel 42 around which the cord is wound and which biases the cord in tension tending to retract it. The force applied by the reel 42 is overcome by the operator holding the stylus 18 of FIG. 1.

Preferably the reel 42 is a constant torque spring motor of the type conventionally available for winding small strings and cables. The cord 16 frictionally engages a sheave 44 which is fixed to the shaft 46 of another shaft encoder 48. It may frictionally engage the sheave 44 either by passing over it or by being looped once around it. In this manner linear displacement of the cord 16 causing it to wind onto or unwind from the reel 42 produces corresponding digital data quantitatively representing the incremental linear translation or displacement.

Figure 6:
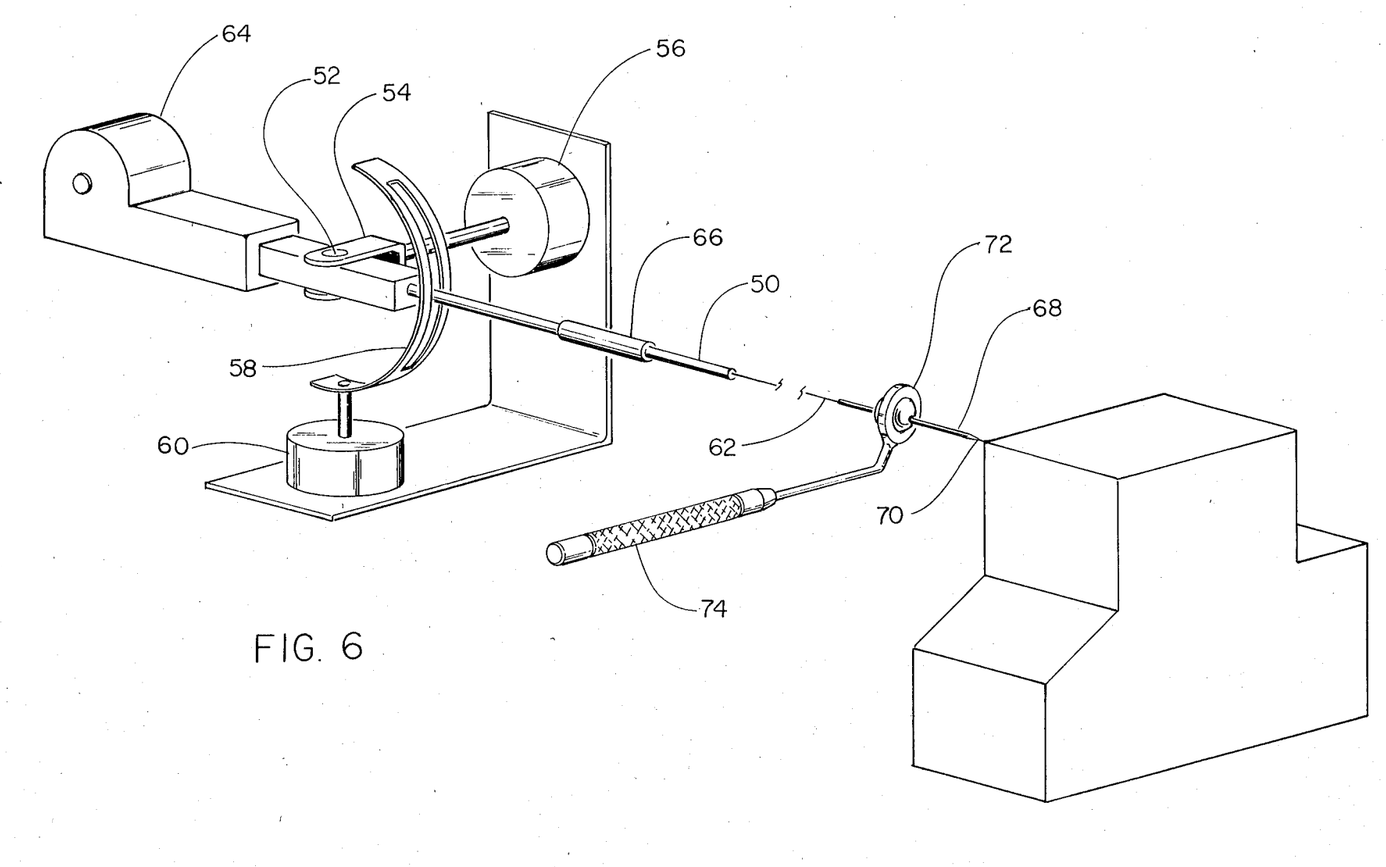
FIG. 6 is a view in perspective of the operational portion of a single cord digitizer for digitizing three-dimensional objects.

The principles of the single cord embodiment illustrated in FIG. 1 may be extended to use for three dimensional objects as illustrated in FIG. 6.

In the embodiment of FIG. 6 a two-dimensional cord guide is formed by a tube 50 which is pivotally mounted through pivot axis 52 to a pivotal yoke 54. The yoke 54 is drivingly connected to a first angular shaft encoder 56. A slotted bar 58 is drivingly linked to an associated second angular encoder 60 and is oriented with its slot generally parallel to the pivto axis of the second encoder 60. Preferably, the yoke 54, and therefore its associated angular encoder 56, pivot about an axis which is perpendicular to the axis of the second encoder 60.

The cord 62 extends through the tube 50 into a linear encoder 64 constructed like the linear encoder illustrated in FIG. 3. A counterbalance weight 66 may be positioned on the tube 50.

The cord 62 extends in the opposite direction to a stylus 68. The stylus 68 consists of a data tip 70 fixed to the ball portion of a ball joint 72 which in turn has its ring portion fixed to a handle 74.

Figure 4:
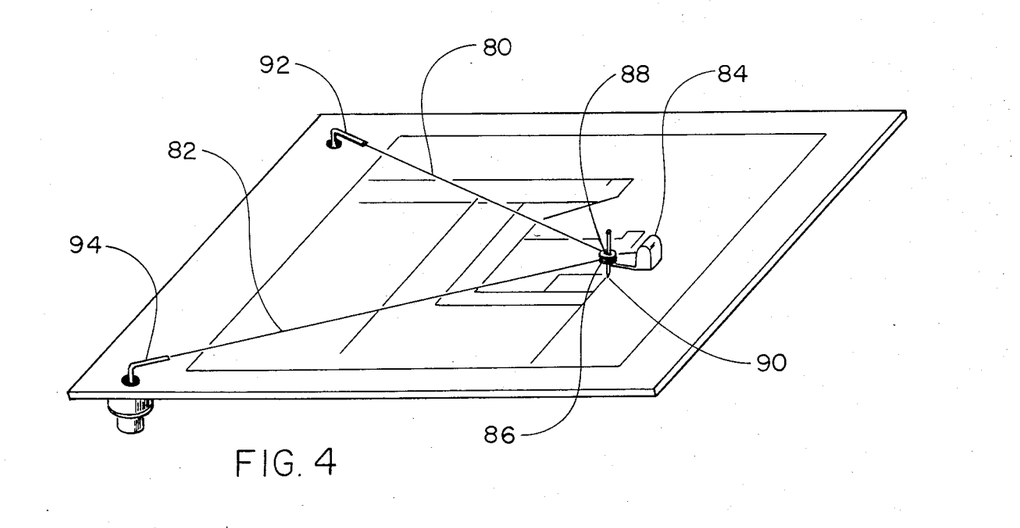
FIG. 4 is a view in perspective of an alternative embodiment of the invention utilizing only angular displacement data for digitizing two-dimensional forms.

FIG. 4 illustrates a digitizer embodying the present invention which detects only incremental changes in angular orientation and does not detect linear displacement of the cords. The advantage of this system is that, because its data is not dependent upon cord length, it is entirely independent of any stretching or gravitationally induced bowing of the cords. It is provided with two cords 80 and 82 extending into connection with a stylus 84. The stylus 84 is provided with a pair of pivotable rings 86 and 88 of the type illustrated in FIG. 8. Each ring is connected to a different cord so that the intersection of the axes of the cords 80 and 82 is always immediately above the data point defined by the data tip 90 of the stylus 84.

Each of the cords 80 and 82 extend through cord guides 92 and 94 of the type illustrated in FIG. 2. However, each is linked only to a single shaft encoder, corresponding to shaft encoder 36 of FIG. 2, and to a simple biased reel or constant torque spring motor. Neither is linked to a linear encoder since linear displacement is not detected.

The two cord guides 92 and 94 are spaced from each other by a distance which is sufficient to provide intersection of the cords 80 and 82 as closely as possible to 90° because as the cords become more nearly parallel the accuracy of the data decreases. Preferably the cord guides 92 and 94 pivot about parallel axes although the trigonometric algorithms could be programmed into the computer for the more complicated and generalized situation when their axes of rotation are not parallel.

Figure 7:
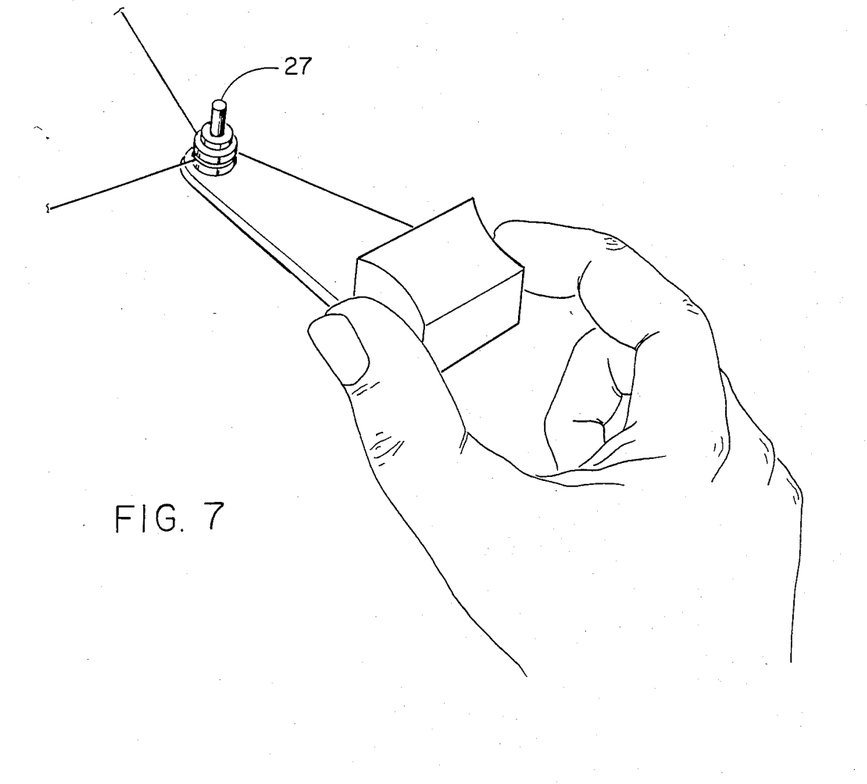
FIG. 7 is a view in perspective of an alternative stylus for use in some embodiments of the invention.

FIG. 7 illustrates an alternative stylus which also utilizes the dual rings but instead of the data tip of the type illustrated in FIG. 7 utilizes a data tip comprising a line of sight hole 27 through which the data points on the form being digitized can be viewed. With the slideable rings of the type illustrated in FIG. 8 the longitudinal axes of the cords will align above the data point.

Figure 5:
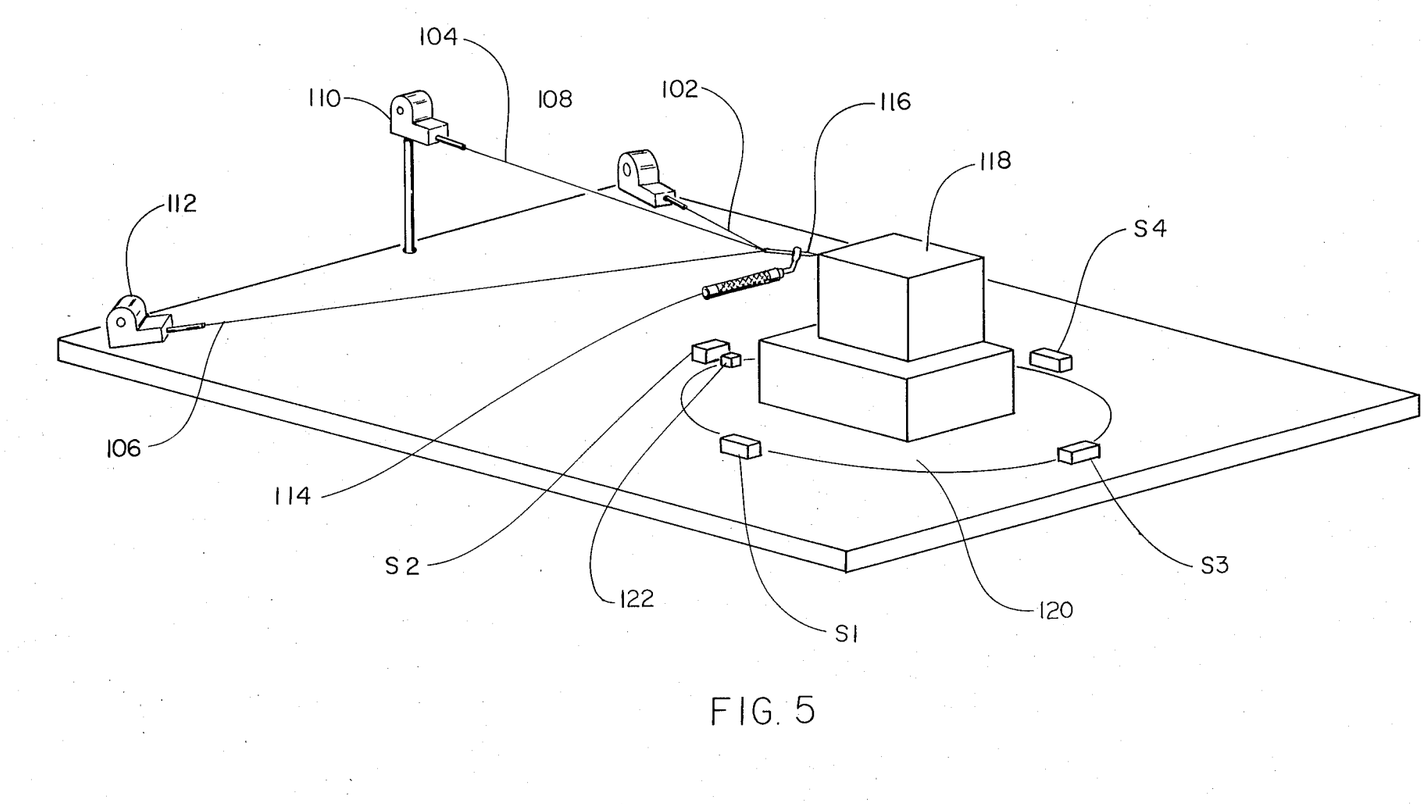
FIG. 5 is a view in perspective of an embodiment of the invention utilizing solely cord linear displacement data which is useful for digitizing three-dimensional objects.

The embodiment of FIG. 5 provides improved accuracy particularly at distant points for three-dimensional digitizing. It has three retractable, flexible cords 102, 104 and 106, each extending from a different retraction and encoding structure 108, 110 and 112, into attachment with a stylus 114. All three of the cords are attached to the same point of the data tip 116 on the stylus 114.

Each of the three cords extends into a different linear encoder each of which is preferably of the type illustrated in FIG. 3. These encoders generate digital data signals which represent only the incremental linear displacement of its associated cord. Thus, with the embodiment of FIG. 5 only data representing linear displacement of each cord is recorded and stored to represent each data point on the object 118 being digitized.

With all the digitizers embodying the present invention which are constructed for digitizing three-dimensional forms, the stylus cannot extend into contact with data points on the side of the object 118 facing away from the encoders 108, 110 and 112 because of interference with the cords by the object 118 itself.

This problem may be solved for all the embodiments of the invention with structure illustrated in FIG. 5. The object 118 to be digitized is mounted to a pivotable support 120. Preferably the pivotable support is, as illustrated, a circular, flat platform which pivots about an axis through and normal to its center.

The pivotable support 120 is connected to an angular position sensing means which generates data signals representing the angular position of the support 120. Although the angular position sensing means could be any of a variety of known devices such as absolute shaft encoders, preferably it is simply constructed utilizing four switches S1, S2, S3 and S4 positioned in quadrature relationship and tripped by a protruding finger 122. Preferably a suitable latch or detent mechanism (not illustrated) is used to releasably retain the pivotable support 120 in each of the four positions. Thus, in each position the protruding finger 122 trips one of the four switches to signal to the computer the position of the form 118. The computer can then simply shift or justify the data received by 0°, 90°, 180° and 270°.

FIG. 8 illustrates a portion of the electronic circuitry for generating and storing the coded digital data representing angular or linear displacement of the cords. Although the circuit illustrates two encoders 202 and 204, for three-dimensional decoders a portion of the circuitry is merely duplicated in accordance with principles well known to those skilled in the art.

Encoder 202 is connected to a direction detector 206 also conventional in the art. The pulses from the encoder 202 are supplied through conductor 208 to counting register of four four-bit up/down counters labelled IC1 through IC4. This allows maximum pulse counts of 65,536 in either direction. The up/down control bit for controlling the direction of counting is applied to each up/down counter from the direction detector 206. This displacement in one direction causes the counters to count up while displacement in the opposite direction causes them to count down.

The outputs from the up/down counters is applied to four latch circuits IC9 through IC12.

The data outputs of the latch circuits IC9–IC12 are connected to lines b1 through b4 of the data bus. Lines b6 through b8 of the data bus are connected to a three bit to eight bit decoder which in turn is connected to the enabling inputs of the latch circuits. In this manner the data of each latch is selectively placed on the data bus in sequence so that the central processor may assemble it in memory.

A switch S1 is actuated to initialize the circuit by clearing all the up/down counters to zero. A switch S2 connected to line b5 of the data bus and to the latches, actuates the latches so they will hold the data count present in the up/down counters at the time switch S2 is actuated. The computer senses actuation of switch S2 at bus line b5 and begins the sequential collection of the count data from the latch circuits.

After the count data is assembled in the memory the computer can calculate the coordinate values of the data point utilizing trigonometry functions and the assembled data.

The preferred embodiments of the invention are relative or incremental digitizers rather than absolute digitizers and the up/down counters are initialized at a selected reference data point. However, the principles of the present invention are applicable to the use of multi-disk, positional decoders which would allow the construction of an absolute positional decoders if that were desired.

As another alternative, the shaft encoders could be analogue sensors such as potentiometers. Such sensors, although introducing other problems, can be used for absolute digitizing because each position defines a unique resistance value. However, a standard, angular decoder providing 500 to 1200 pulses for one complete shaft revolution, such as that shown in the above cited Hewlett Packard brochure, is preferred.

The structure of the present invention is suitable for "soft keys" 301 illustrated in FIG. 1. Such "soft keys" are known in other devices and are simply uniquely assigned physical positions which, when identified by the computer, signals some information to the computer.

For example, if the stylus 18 is positioned on one particular "soft key" and the switch S2 is actuated, the positioned detected by the computer may signal that the previous two points are to be connected by a particular color, so that an area of a graphical illustration be filled in with a particular color or that the last point was the center of a circle or that certain points should be connected by a cord of a circle or segment of a circle or other similar manually input signals to the computer. Thus, for example, the digitizer of the present invention is particularly adaptable to computer art and graphical composition.

In the operation of the present invention the operator positions the stylus at the reference point and actuates the switch S1. Thereupon the operator sequentially positions the stylus at various data points on the object or form being digitized. Each time the stylus is properly positioned at a data point, the switch S2 is actuated to read the appropriate position data into the computer. Thereupon the computer operates in accordance with known trigonometric algorithms to convert the data representing cord linear translation and angular displacement to traditional coordinate system data such as Cartesian and polar coordinates.

It is to be understood that while the detailed drawings and specific examples given describe preferred embodiments of the invention, they are for the purposes of illustration only, that the apparatus of the invention is not limited to the precise details and conditions disclosed and that various changes may be made therein without departing from the spirit of the invention which is defined by the following claims.

I claim:

1. A digitizer for digitally encoding a geometrical form, which is mounted to a support, into coordinate system digital data representing the form, the digitizer comprising:
   (a) a stylus having a data tip;
   (b) a single, retractable, flexible cord extending into attachment with said stylus and biased in tension toward retraction;
   (c) an angularly pivotable cord guide having said cord extending through it for following the angular orientation of said cord;

(d) at least one angular encoder means attached to said cord guide for generating digitial data signals representing the angular displacement of the angular orientation of said cord; and (e) a linear encoder means linked to said cord for generating digital data signals representing linear displacement of said cord wherein said cord guide is a two-dimensional cord guide having two of said angular encoder means each linked to said cord guide and having their respective pivot axes relatively aligned at 90°.

2. A digitizer in accordance with claim 1 wherein said cord guides comprises a slotted bar drivingly linked to its associated angular encoder and having its slot generally parallel to the pivot axis of said encoder with said cord passing through said slot.

3. A digitizer in accordance with claim 2 wherein said cord guide further comprises a tube pivotally mounted to a pivotable yoke which is drivingly connected to the angular encoder, said tube and said yoke pivoting about mutually perpendicular axes, said cord extending through said tube.

4. A digitizer for digitally encoding a geometrical form, which is mounted to a support, into coordinate system digital data representing the form, the digitizer comprising:

(a) a stylus having a data tip;

(b) a single, retractable, flexible cord extending into attachment with said stylus and biased in tension toward retraction;

(c) an angularly pivotable cord guide having said cord extending through it for following the angular orientation of said cord;

(d) at least one angular encoder means attached to said cord guide for generating digital data signals representing the angular displacement of the angular orientation of said cord; and (e) a linear encoder means linked to said cord for generating digital data signals representing linear displacement of said cord wherein there is one cord guide which comprises a tube bent at a right angle, one end of said tube extending toward said stylus and the other end drivingly linked to said angular encoder for response to pivotal movement of said other end about its axis.

5. A digitizer for digitally encoding a geometrical form, which is mounted to a support, into coordinate system digital data representing said form, said digitizer being independent of linear measurement and comprising:

(a) a stylus having a data tip;

(b) at least two retractable, flexible cords extending into attachment with said stylus, each cord biased in tension toward retraction but having its length of extension unmetered;

(c) a different angularly pivotable cord guide associated with each of said cords, said guides being spaced from each other and each having its associated cord extending through it for following the orientation of its associated cord; and (d) a different angular encoder means attached to each of said cord guides.

6. A digitizer in accordance with claim 5 wherein the pivot axes of two of said encoder means are parallel.

7. A digitizer in accordance with claim 5 wherein each of said cord guides comprises a tube bent at right angles, one end of said tube extending toward said stylus and the other end drivingly linked to said angular encoder.

8. A digitizer for digitally encoding a three-dimensional body mounted to a support into coordinate system data representing the body, the digitizer comprising:

(a) a stylus having a data tip;

(b) three retractable, flexible cords each extending from a different, spaced cord supply into attachment with said stylus and all substantially intersecting said data tip each of said cords being biased in tension toward retraction at least one spaced cord supply being positioned above a reference plane defined by a point on said body and the other two of said cord supplies; and (c) a different linear encoder means linked to each of said cords for generating digital data signals representing the linear displacement of its associated cord.

9. A digitizer in accordance with claim 8 wherein said linear encoder means comprises a cord winding reel and an angular encoder drivingly linked to it.

10. A digitizer in accordance with claim 8 wherein said linear encoder means comprises a sheave having said cord looped around it and an angular encoder drivingly linked to it.

11. A digitizer in accordance with claims 5 or 8 further comprising:

(a) a pivotable support for mounting said geometrical form; and (b) angular position sensing means connected to said pivotable support for generating data signals representing the angular position of said support.

12. A digitizer for digitally encoding a geometrical form, which is mounted to a support, into coordinate system digital data representing the form, the digitizer comprising:

(a) a stylus having a data tip;

(b) a single, retractable, flexible cord extending into attachment with said stylus and biased in tension toward retraction;

(c) an angularly pivotable cord guide having said cord extending through it for following the angular orientation of said cord, said cord guide further comprising a tube pivotally mounted to a pivotable yoke which is drivingly connected to the angular encoder, said tube and said yoke pivoting about mutually perpendicular axes, said cord extending through said tube;

(d) at least one angular encoder means attached to said cord guide for generating digital data signals representing the angular displacement of the angular orientation of said cord; and (e) a linear encoder means linked to said cord for generating digital data signals representing linear displacement of said cord.

13. A digitizer for digitally encoding a geometrical form, which is mounted to a support, into coordinate system digital data representing the form, the digitizer comprising:

(a) a stylus having a data tip;

(b) a single, retractable, flexible cord extending into attachment with said stylus and biased in tension toward retraction;

(c) an angularly pivotable cord guide having said cord extending through it for following the angular orientation of said cord;

(d) at least one angular encoder means attached to said cord guide for generating digital data signals representing the angular displacement of the angular orientation of said cord;

(e) a linear encoder means linked to said cord for generating digital data signals representing linear displacement of said cord;

(f) a pivotable support for mounting said geometrical form; and (g) angular position sensing means connected to said pivotable support for generating data signals representing the angular position of said support.

* * * * *